US006576735B2

(12) United States Patent
Kanagawa et al.

(10) Patent No.: US 6,576,735 B2
(45) Date of Patent: Jun. 10, 2003

(54) POLYCARBONATE RESIN

(75) Inventors: Tatsuya Kanagawa, Toyonaka (JP); Noriyoshi Ogawa, Toyonaka (JP); Hidekazu Nakatani, Toyonaka (JP); Noriaki Honda, Toyonaka (JP); Mitsuhiko Masumoto, Toyonaka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/949,851

(22) Filed: Sep. 12, 2001

(65) Prior Publication Data
US 2002/0061997 A1 May 23, 2002

Related U.S. Application Data

(63) Continuation-in-part of application No. 09/703,648, filed on Nov. 2, 2000, now abandoned.

(30) Foreign Application Priority Data

Nov. 2, 1999 (JP) .............................. 11-312077
Feb. 22, 2000 (JP) ....................... 2000-044909
Mar. 27, 2000 (JP) ....................... 2000-086294

(51) Int. Cl.$^7$ ..................... C08G 64/08; C08G 77/448
(52) U.S. Cl. ........................ 528/29; 528/25; 528/201; 528/204; 525/464; 525/474
(58) Field of Search ................ 528/25, 29, 201, 528/204; 525/464, 474

(56) References Cited

U.S. PATENT DOCUMENTS 5,739,257 A  * 4/1998  Boden et al.
6,258,498 B1 * 7/2001  Kawahara et al.

FOREIGN PATENT DOCUMENTS

| DE | 195 23 000 A1 | 1/1996 |
| EP | 0 864 599 A2 | 9/1998 |
| EP | 0 896 975 A1 | 2/1999 |
| JP | 48-64199 | 9/1973 |
| JP | 6-220181 | 8/1994 |
| JP | 09-080791 | * 3/1997 |

OTHER PUBLICATIONS

Cagen, S.Z., et al., "Normal Reproductive Organ Development in CF–1 Mice following Prenatal Exposure to Bisphenol A", Toxicology Sciences, p. 36–44 (1999).

* cited by examiner

Primary Examiner—David J. Buttner
(74) Attorney, Agent, or Firm—Sughrue Mion, PLLC

(57) ABSTRACT

A polycarbonate resin obtainable by reaction of a carbonic acid ester-forming compound with bisphenols consisting essentially of 9,9-bis(4-hydroxy-3-methylphenyl) fluorene and a bisphenol compound(s) having a polysiloxane skeleton, an intrinsic viscosity of said polycarbonate resin being 0.2 to 2.0 dl/g.

9 Claims, No Drawings

POLYCARBONATE RESIN

This is a Continuation-in-Part of application Ser. No. 09/703,648 filed Nov. 2, 2000 Now Abandoned.

BACKGROUND OF THE INVENTION

1) Field on the Invention

The present invention relates to a polycarbonate resin with excellent molding. The polycarbonate resin is suitably applicable to uses such as medical instrument parts, table wares, cooking wares and uses such as optical recording media including optical discs, compact discs, laser discs, optical cards, MO discs and digital video discs, electrophotography, spectacle lenses, toys etc.

2) Prior Art

A polycarbonate resin (bisphenol A type polycarbonate resin) obtainable by reaction of 2,2-bis(4-hydroxyphenyl)propane with a carbonic acid ester-forming compound is excellent in transparency, heat resistance, mechanical properties and dimension stability and used widely as engineering plastics. Further, in recent years, polycarbonate resins having various bisphenol skeletons other than the bisphenol A type polycarbonate resins have been suggested and applied to binders for electrophotography, optical recording media such as optical discs, heat resistance films, polarizing films, table wares, cooking wares, etc. As the above-mentioned uses, prior polycarbonates with a fluorene skeleton (Japanese Patent Kokai Nos. 6-145317, 6-25398, 6-216078, 6-322094 and 8-134199) exhibited inferior molding since it had a rigid skeleton and prior polycarbonates with a polysiloxane skeleton (Japanese Patent Kokai No.3-79626 and Japanese Patent No.2662310) also did not exhibit sufficient molding. Thus, there was room of improvement of molding.

SUMMARY OF THE INVENTION

An object of the present invention is to provide a polycarbonate resin with excellent molding.

As a result of extensive studies to solve the above-mentioned prior art problems, the inventors have found that a polycarbonate resin obtained from a bisphenol compound having a specific fluorene structure and a bisphenol compound having a specific polysiloxane structure possesses good molding, and have accomplished the present invention.

That is, the present invention provides a polycarbonate resin obtained by reaction of a carbonic acid ester-forming compound with bisphenols consisting of 9,9-bis(4-hydroxy-3-methylphenyl)fluorene and a bisphenol compound(s) having a structure represented by the following general formula (A), an intrinsic viscosity of said polycarbonate resin being 0.2 to 2.0 dl/g;

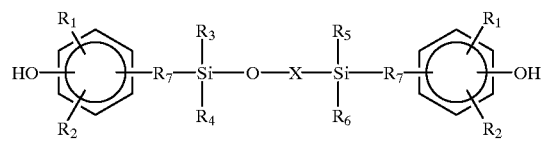

(A)

wherein $R_1$ and $R_2$ are, each independently, hydrogen, fluorine, chlorine, bromine, iodine, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl having 7 to 17 carbon atoms, an alkyl group having 1 to 5 carbon atoms with a substituent(s) of an alkyl group having 1 to 5 carbon atoms, an alkenyl group having 2 to 5 carbon atoms, an alkoxy group having 1 to 5 carbon atoms, fluorine, chlorine, bromine or iodine, an aryl group having 6 to 12 carbon atoms with said same substituent(s), an alkenyl group having 2 to 5 carbon atoms with said same substituent(s), an alkoxy group having 1 to 5 carbon atoms with said same substituent(s) or an aralkyl having 7 to 17 carbon atoms with said same substituent(s); $R_3$, $R_4$, $R_5$ and $R_6$ are, each independently, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl having 7 to 17 carbon atoms, an alkyl group having 1 to 5 carbon atoms with a substituent(s) of an alkyl group having 1 to 5 carbon atoms, an alkenyl group having 2 to 5 carbon atoms, an alkoxy group having 1 to 5 carbon atoms, fluorine, chlorine, bromine or iodine, an aryl group having 6 to 12 carbon atoms with said same substituent(s), an alkenyl group having 2 to 5 carbon atoms with said same substituent(s), an alkoxy group having 1 to 5 carbon atoms with said same substituent(s) or an aralkyl having 7 to 17 carbon atoms with said same substituent(s); $R_7$ is an alkylene group having 1 to 6 carbon atoms, an alkylidene group having 1 to 6 carbon atoms or absent; X is $—Si(R_8)(R_9)O—$, $—Si(R_{10})(R_{11})O—$, a homopolymer of $—Si(R_8)(R_9)O—$ or $—Si(R_{10})(R_{11})O—$ having an average polymerization degree of more than 0 and 200 or below or a random copolymer of $—Si(R_8)(R_9)O—$ and $—Si(R_{10})(R_{11})O—$ having an average polymerization degree of more than 0 and 200 or below; $R_8$, $R_9$, $R_{10}$ and $R_{11}$ are, each independently, hydrogen, fluorine, chlorine, bromine, iodine, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl having 7 to 17 carbon atoms, an alkyl group having 1 to 5 carbon atoms with a substituent(s) of an alkyl group having 1 to 5 carbon atoms, an alkenyl group having 2 to 5 carbon atoms, an alkoxy group having 1 to 5 carbon atoms, fluorine, chlorine, bromine or iodine, an aryl group having 6 to 12 carbon atoms with said same substituent(s), an alkenyl group having 2 to 5 carbon atoms with said same substituent(s), an alkoxy group having 1 to 5 carbon atoms with said same substituent(s) or an aralkyl having 7 to 17 carbon atoms with said same substituent(s).

DETAILED DESCRIPTION OF THE INVENTION

That is, the present invention is a polycarbonate resin obtained by reacting a carbonic acid ester-forming compound with bisphenols consisting of 9,9-bis(4-hydroxy-3-methylphenyl)fluorene and a bisphenol compound(s) having a structure represented by the general formula (A), an intrinsic viscosity of said polycarbonate resin being 0.2 to 2.0 dl/g;

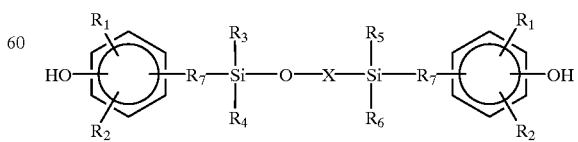

(A)

wherein $R_1$ and $R_2$ are, each independently, hydrogen, fluorine, chlorine, bromine, iodine, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl having 7 to 17 carbon atoms, an alkyl group having 1 to 5 carbon atoms with a substituent(s) of an alkyl group having 1 to 5 carbon atoms, an alkenyl group having 2 to 5 carbon atoms, an alkoxy group having 1 to 5 carbon atoms, fluorine, chlorine, bromine or iodine, an aryl group having 6 to 12 carbon atoms with said same substituent(s), an alkenyl group having 2 to 5 carbon atoms with said same substituent (s), an alkoxy group having 1 to 5 carbon atoms with said same substituent(s) or an aralkyl having 7 to 17 carbon atoms with said same substituent(s); $R_3$, $R_4$, $R_5$ and $R_6$ are, each independently, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl having 7 to 17 carbon atoms, an alkyl group having 1 to 5 carbon atoms with a substituent (s) of an alkyl group having 1 to 5 carbon atoms, an alkenyl group having 2 to 5 carbon atoms, an alkoxy group having 1 to 5 carbon atoms, fluorine, chlorine, bromine or iodine, an aryl group having 6 to 12 carbon atoms with said same substituent(s), an alkenyl group having 2 to 5 carbon atoms with said same substituent(s), an alkoxy group having 1 to 5 carbon atoms with said same substituent(s) or an aralkyl having 7 to 17 carbon atoms with said same substituent(s); $R_7$ is an alkylene group having 1 to 6 carbon atoms, an alkylidene group having 1 to 6 carbon atoms or absent; X is —$Si(R_8)(R_9)O$—, —$Si(R_{10})(R_{11})O$—, a homopolymer of —$Si(R_8)(R_9)O$— or —$Si(R_{10})(R_{11})O$— having an average polymerization degree of more than 0 and 200 or below or a random copolymer of —$Si(R_8)(R_9)O$— and —$Si(R_{10})(R_{11})O$— having an average polymerization degree of more than 0 and 200 or below $R_8$, $R_9$, $R_{10}$ and $R_{11}$ are, each independently, hydrogen, fluorine, chlorine, bromine, iodine, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl having 7 to 17 carbon atoms, an alkyl group having 1 to 5 carbon atoms with a substituent(s) of an alkyl group having 1 to 5 carbon atoms, an alkenyl group having 2 to 5 carbon atoms, an alkoxy group having 1 to 5 carbon atoms, fluorine, chlorine, bromine or iodine, an aryl group having 6 to 12 carbon atoms with said same substituent(s), an alkenyl group having 2 to 5 carbon atoms with said same substituent(s), an alkoxy group having 1 to 5 carbon atoms with said same substituent(s) or an aralkyl having 7 to 17 carbon atoms with said same substituent(s).

Japanese Patent Kokai (Laid-open) Nos. 6-145317, 6-25398, 6-216078, 6-322094 and 8-134199 disclose that a polycarbonate resin having a fluorene skeleton has hitherto been applied to optical recording media, phase difference films, flat panel displays and lenses by utilizing its optical characteristics. Japanese Patent Kokai (Laid-open) Nos. 6-3838 and 8-134198 disclose that it has been applied to electrophotography and cast films. Further, Japanese Patent Kokai (Laid-open) No. 6-49195 discloses that it has been applied to high heat resistance table wares applicable to a microwave oven.

However, bisphenol having a fluorene skeleton exhibits inferior molding since it has a rigid structure. It was necessary to introduce a soft segment in order to improve molding.

On the other hand, Japanese Patent Kokai (Laid-open) No.3-79626 and Japanese Patent No.2662310 disclose a polycarbonate having a polysiloxane skeleton.

However, since the above-mentioned polycarbonate also did not exhibit sufficent molding, there was room for improvement of molding.

The present invention relates to a polycarbonate resin obtainable by reaction of bisphenols with a carbonic acid ester-forming compound wherein said bisphenols consists of 9,9-bis(4-hydroxy-3-methylphenyl) fluorene (hereinafter, "BCFL") and a bisphenol compound(s) represented by the formula (A) and the amount of the bisphenol compound represented by the formula (A) is 10 to 80% by weight to total amount of the bisphenol compound of the formula (A) and BCFL and the intrinsic viscosity of the polycarbonate thus obtained is 0.2 to 2.0 dl/g.

As the process for producing the polycarbonate resin of the present invention, known processes for producing a polycarbonate resin from bisphenol A and a carbonic acid ester-forming compound, e.g., a process comprising a direct reaction between bisphenol and phosgene (phosgene process) or a process comprising transesterification between bisphenol and a bisaryl carbonate (transesterification process) can be applied.

In the present invention, when the phosgene process is applied, a process comprising reacting excess phosgene with BCFL and then reacting reaction products thus obtained with bisphenol compound of the formula (A) or a process comprising reacting phosgene, BCFL and bisphenol compound of the formula (A) simultaneously may be applied. When the transesterification process is applied, it is preferable to react bisaryl carbonate, BCFL and bisphenol compound of the formula (A) simultaneously.

Among the phosgene process and the transesterfication process, it is preferable to apply the phosgene process, considering reactivity between BCFL and bisphenol compound of the formula (A).

In the phosgene process, the reaction of BCFL, bisphenol compound of the formula (A) and phosgene is performed usually in the presence of an acid bonding agent and a solvent.

Examples of the acid bonding agent include pyridine and alkali metal hydroxides including sodium hydroxide and potassium hydroxide.

Examples of the solvent include methylene chloride, chloroform, chlorobenzene and xylene.

Further, in order to promote polycondensation, catalysts including tertiary amines such as triethylamine and tetraammonium salts are added. In order to adjust polymerization degree, monofunctional compounds including phenol, p-t-butyl phenol and p-cumyl phenol are added as molecular weight modifier. If necessary, a small amount of antioxidants including sodium sulfite and sodium dithionite and a small amount of branching agents including phloroglucine, isatin bisphenol, 1,1,1-tris(4-hydroxyphenyl)ethane and α,α',α"-tris(4-hydroxyphenyl)-1,3,5-triisopropyl benzene may be added.

The reaction temperature is usually in the range of 0 to 150° C. and preferably in the range of 5 to 40° C. The reaction time is usually 0.5 minutes to 10 hours and preferably 1 minute to 2 hours, depending on the reaction temperature. It is preferable to maintain pH of the reaction system to 10 or above during the reaction.

In the transesterification process, a mixture of BCFL, bisphenol compound of the formula (A) and bisaryl carbonate is reacted under a reduced pressure at a high temperature. In this reaction, a monofunctional compound(s) including p-t-butyl phenol and p-cumyl phenol may be added as molecular weight modifier.

The reaction is performed usually at a temperature of 150 to 350° C. and preferably 200 to 300° C. Phenols by-produced by transesterification and derived from bisaryl carbonate are distilled off preferably under a final reduced pressure degree of 1 mmHg or below outside the reaction system. The reaction time is usually about 1 to 6 hours, depending on the reaction temperature or the reduced pressure degree. It is preferable to perform the reaction under the atmosphere of an inert gas such as nitrogen, argon, etc. If necessary, an antioxidant(s) and a branching agent(s) may be added.

Examples of the carbonic acid ester-forming compound include phosgene and bisaryl carbonates such as diphenyl carbonate, di-p-tolyl carbonate, phenyl-p-tolyl carbonate, di-p-chlorophenyl carbonate and dinaphthyl carbonate and a combination of two species of the compounds thereof or above.

Examples of bisphenol compound of the formula (A) include the compounds represented by the below structural formulas and a combination of two species of the compounds thereof or above.

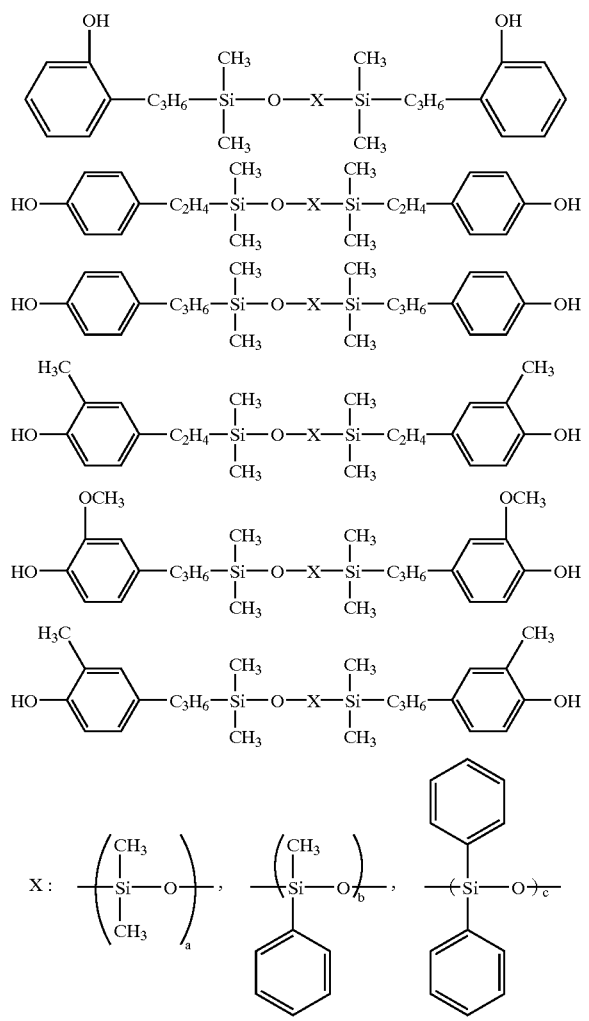

Among them, at least one compound selected from the group consisting of α,ω-bis[3-(o-hydroxyphenyl)propyl] polydimethylsiloxane, α,ω-bis[2-(p-hydroxyphenyl)ethyl] polydimethlsiloxane, a random copolymer of dimethylsiloxane and methylphenylsiloxane having 3-(o-hydroxyphenyl) propyl group at α and ω positions and a random copolymer of dimethylsiloxane and diphenylsiloxane having 3-(o-hydroxyphenyl) propyl group at α and ω positions is preferable from the aspect of reactivity.

As the molecular weight modifier which may be used in the present invention, monohydric phenol is preferable. Particularly, it is preferable to use as the molecular weight modifier alkyl phenols having 1 to 4 carbon atoms: alkyl hydroxy benzoate having 1 to 4 carbon atoms and alkyl oxy phenols having 1 to 4 carbon atoms. Among them, phenol and p-t-butyl phenol are preferable.

When the phosgene process is applied to the present invention, it is preferable to react phosgene with BCFL, or BCFL and bisphenol compound of the formula (A) in the presence of a tetraammonium salt in order to perform efficiently the reaction. Examples of tetraammonium salt include tetramethylammonium chloride, trimethylbenzylammonium chloride, triethylbenzylammonium chloride, tetraethylammonium bromide and tetra-n-butylammonium iodide, among which trimethylbenzylammonium chloride and triethylbenzylammonium chloride are preferable. It is preferable that the amount of tetraammonium salt is usually 0.0005 to 5 mol % to total amount of bisphenols to be used.

When the phosgene process is applied, the reactivity is further improved by applying a process comprising reacting excess phosgene with BCFL and then reacting a solution in the state of emulsion thus obtained with bisphenol compound of the formula (A).

The polycarbonate resin thus synthesized can be molded by known molding methods including extrusion molding, injection molding, blow molding, compression molding and wet molding. In order to mold readily and maintain necessary strength, it is preferable that the intrinsic viscosity of the polycarbonate resin is in the range of 0.2 to 2.0 dl/g.

It is preferable that the amount of bisphenol compound of the formula (A) is 10 to 80% by weight to total amount of BCFL and bisphenol compound of the formula (A). When bisphenol compound of the formula (A) is below 10% by weight, effects as soft segment are small and molding and solvent solubility are inferior, whereas above 80% by weight effects as soft segment are too large and the polycarbonate resin is readily changed to a viscous liquid or a rubbery substance.

It is not preferable that impurities unable to remove in the production process are mixed in raw materials of the polycarbonate resin in the present invention. It is preferable to use previously sufficiently purified raw materials.

In order to ensure stability and mold releasing necessary during molding, if necessary, antioxidants such as hindered phenols and phosphates; lubricants and mold releasing agents such as silicones, fatty acid esters, fatty acids and natural fats and oils including bees wax; light stabilizers such as benzotriazoles, benzophenones, dibenzoyl methane and salicylates and antistatic agents such as polyalkylene glycols and fatty acid glycerides may be used together with the polycarbonate resin. Further, a mixture of the polycarbonate resin with resin other than the polycarboante resin may optionally be used within the range not to impair performances.

PREFERRED EMBODIMENT OF THE INVENTION

The present invention will be described in more detail below, referring to Examples, which are not intended to limit the scope of the present invention.

Each properties were measured according to the following methods.

[Intrinsic viscosity [η]]

Intrinsic viscosity [η][dl/g] was measured for a polycarbonate resin solution of 0.5 g/dl concentration in methylene chloride solvent at Huggins's constant of 0.45 at a temperature of 20° C.

[Tensile Test]

18 g of a polycarbonate resin sample was dissolved in 132 g of dichloromethane. A cast film was made from 12 wt/wt % polycarbonate resin solution thus obtained with a spacer of 600 μm and dried. Then, a dumbbell specimen (total length 165 mm, long width 19 mm, short width 13 mm and thickness about 50 μm) according to ASTM D638-84I was punched and prepared.

Tensile test was performed for the dumbbell specimen thus prepared in a room adjusted to 23° C. and 50% RH with Tensilon UTM-5, manufactured by Toyo Boldwien k.k., in Japan at a tensile velocity of 50 mm/min., under a load cell of 196N to measure strength and elongation according to ASTM D-882.

[Evaluation of Heat Resistance]

A glass transition temperature and 1% reduced amount starting temperature were measured for a polycarbonate resin powder under the atmosphere of nitrogen with a thermal analyzer (DSC-50, TGA-50H), manufactured by k.k. Shimazu Seisakusho, in Japan. When the glass transition temperature is not clear (appearance of some minute inflection points), the largest inflection point among the inflection points was regarded as a glass transition temperature.

[Evaluation of Appearance of Wet Molded Film]

18 g of a polycarbonate resin sample was dissolved in 132 g of dichloromethane. A 12 wt/wt % polycarbonate resin solution thus obtained was casted with a spacer of 600 μm and dried, thereby obtaining a wet molded film of thickness about 50 μm. Its appearance was evaluated visually.

[Evaluation of Appearance of Compression Molded Article]

A compression molded article (length about 100 mm, width about 100 mm, thickness about 3.2 mm) was prepared from about 50 g of a polycarbonate resin sample with a compression molder S-37, manufactured by k.k. Kamifuji Kinzoku Kogyo, in Japan under compression conditions of 300° C. and 9.8 MPa. Its appearance was evaluated visually.

[Birefringence]

The measurement was performed for an injection molded sample of a polycarbonate resin with ARD 130N, manufactured by Oak Co., by a light of 30 degree oblique incidence angle and wave length 632.8 nm.

[Transcription]

The measurement was performed for an injection molded sample of a polycarbonate resin with an atomic force microscope NV2100, manufactured by Olympus Co.

[Photoelastic Sensitivity]

A cast film of thickness 50 μm was prepared from a polycarbonate resin powder sample. The measurement was performed for the cast film with auto-Ellipsometer, manufactured by k.k., Mizojiri Kogaku Kogyo, in Japan under a load of 300 to 1100 g in a wave length of 632.8 nm.

EXAMPLE 1

113.4 g (0.3 mol) of 9,9-bis(3-methyl-4-hydroxyphenyl) fluorene (hereinafter, "BCFL") and 0.1 g of sodium dithionite were dissolved in 550 ml of 8.8% (w/v) sodium hydroxide aqueous solution. 500 ml of methylene chloride were added thereto and 0.05 g of triethylbenzylammonium chloride with stirring while maintaining to 15° C. and then 51 g of phosgene was injected over 50 minutes.

After the completion of injection, 0.56 g of phenol was added. 100 ml of 8.8% (w/v) sodium hydroxide aqueous solution were further added thereto and then the reaction liquid was emulsified with vigorous stirring for one minute and 120 g of α,ω-bis[3-(o-hydroxyphenyl)propyl] polydimethylsiloxane having average polymerization degree a=39 (hereinafter, "Si1") represented by the below structure was added thereto with stirring. Then, after 10 minutes, 0.2 ml of triethylamine (TEA) was added thereto and polymerization was preformed for about one hour with stirring.

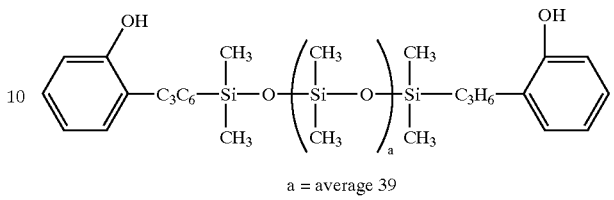

a = average 39

The polymer liquid was separated into an aqueous phase and an organic phase. The organic phase was neutralized with phosphoric acid. Water washing was repeated until pH of washed liquid became 10 μS/cm or below. The polymer liquid thus obtained was added in drop wise to hot water maintained to 60° C. and the polymer was granulated while vaporizing the solvent to remove. The white powdery polymer thus obtained was filtered and dried at 105° C. for 8 hours, whereby a powdery resin was obtained.

The intrinsic viscosity [η] of the polymer was 0.49 dl/g. The polymer was analyzed by infrared absorption spectrum. Absorption due to carbonyl group near 1770 cm$^{-1}$ and absorption due to ether bond near 1240 cm$^{-1}$ were detected. It was confirmed that the polymer had carbonate bond.

EXAMPLE 2

The experiment was performed in the same manner as in Example 1 except that Si1 was changed to 80 g of a random copolymer having the below structure of dimethylsiloxane and diphenylsiloxane having 3-(o-hydroxyphenyl)propyl group at α and ω positions and having average polymerization degree a=36 and c=4 (hereinafter "Si2") and 0.9 g of phenol was used instead of 0.56 g of phenol.

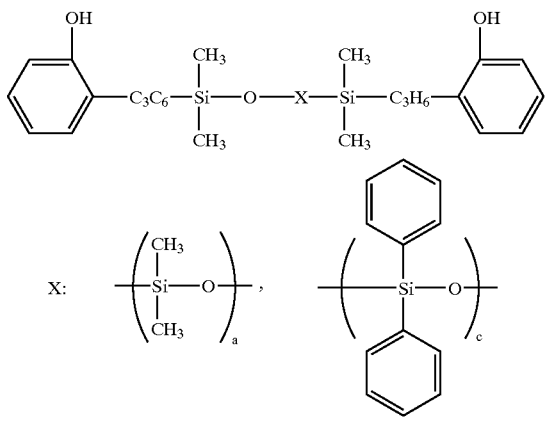

a = average 36
c = average 4

The intrinsic viscosity [η] of the polymer thus obtained was 0.38 dl/g. It was confirmed that the polymer had carbonate bond by infrared absorption spectrum.

EXAMPLE 3

The experiment was performed in the same manner as in Example 1 except that Si1 was changed to 110 g of a random copolymer represented by the below structure of dimethylsiloxane and diphenylsiloxane having 3-(o-hydroxyphenyl) propyl group at α and ω positions and having average polymerization degree a=14 and c=6 (hereinafter "Si3") and Si3 was added together with BCFL and then phosgene was injected.

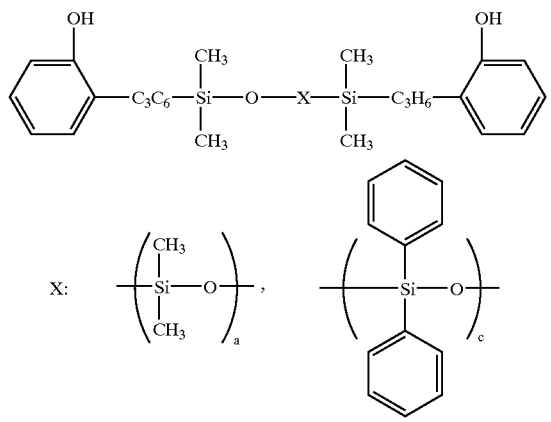

a = average 14
c = average 6

The intrinsic viscosity [η] of the polymer thus obtained was 0.44 dl/g. It was confirmed that the polymer had carbonate bond by infrared absorption spectrum.

COMPARATIVE EXAMPLE 1

The experiment was performed in the same manner as in Example 1 except that 113.4 g (0.3 mol) of BCFL was changed to 56.7 g (0.15 mol) of BCFL and Si1 was changed to 34.2 g (0.15 mol) of 2,2-bis(4-hydroxyphenyl)propane (hereinafter "BPA") and BCFL was added together with BPA and then phosgene was injected.

The intrinsic viscosity [η] of the polymer thus obtained was 0.68 dl/g. It was confirmed that the polymer had carbonate bond by infrared absorption spectrum.

COMPARATIVE EXAMPLE 2

A commercial bisphenol A type polycarbonate resin (trade name "LEXANE 121", manufactured by GE Plastic Co., Ltd., was used.

COMPARATIVE EXAMPLE 3

100 g of Si1 and 0.1 g of sodium dithionite were added to 250 ml of 8.8% (w/v) sodium hydroxide aqueous solution and 400 ml of methylene chloride was added thereto. 0.05 g of triethylbenzylammonium chloride was added thereto with stirring while maintaining to 15° C. and 11 g of phosgene was injected over 11 minutes.

After the completion of injection, 0.94 g of phenol was added. 50 ml of 8.8% (w/v) sodium hydroxide aqueous solution was further added thereto and then the reaction liquid was emulsified with vigorous stirring. After emulsification, 0.2 ml of triethylamine (TEA) was added thereto and polymerization was performed for one hour with stirring. Then, the same treatment as in Example 1 was performed.

The polymer thus obtained was a viscous liquid, so that it could not be granulated. The intrinsic viscosity [η] of the polymer was 0.14 dl/g. It was confirmed that the polymer had carbonate bond by infrared absorption spectrum.

COMPARATIVE EXAMPLE 4

The experiment was performed in the same manner as in Example 1 except that Si1 was not used. The polymer thus obtained became a powder undissolved in a solvent. It was impossible to measure an intrinsic viscosity. It was confirmed that the polymer had carbonate bond by infrared absorption spectrum.

In Examples 1 to 3 and Comparative Examples 1 to 2, wet molded films (thickness 50 μm, width 13 mm, dumbbell type) were prepared. In Comparative Examples 3 and 4, molded specimens could not be obtained since the sample in Comparative Example 3 was liquid and the sample in Comparative Example 4 was undissolved in a solvent.

The results of tensile test and evaluation of heat resistance for wet molded films prepared in Examples 1 to 3 and Comparative Examples 1 to 2 were shown in Table 2.

As clear from Table 1, there is a difference in mechanical strength between the polycarbonate resins in Examples 1 to 3 and conventional polycarbonate resins in Comparative Examples 1 to 2, but the polycarbonate resins in Examples sufficiently maintain mechanical strength as a molding material. The glass transition temperature in heat resistance in Examples 1 to 3 is equal with that in Comparative Examples 1 to 2. The polycarbonate resins in Examples 1 to 3 exhibit heat resistance with 1% reduced amount starting temperature of 380° C. or above as the highest temperature condition in injection molding of bisphenol A type polycarbonate.

The results of observation for appearance of wet molded films and appearance of compression molded articles of the polycarbonate resins in Examples 1 to 3 and Comparative Examples 1 to 4 were shown in Table 2.

As clear from Table 2, the polycarbonate resins of Examples 1 to 3 exhibit moldability about equal to those of Comparative Examples 1 to 2. As in Comparative Examples 3 to 4, in each case of 100% BCFL component or 100% Si component, it is impossible to mold or bad molding occurs.

The polycarbonate resin exhibits more excellent processing than that of conventional polycarbonate resin. Therefore, the polycarbonate resin is suitable to uses such as medical instruments, table wares, cooking wares and drink bottles or uses such as binders for electrophotography, optical recording media including optical discs, compact discs, laser discs, optical cards, MO discs and digital video discs, spectacle lenses, toys, etc.

EXAMPLE 4

2.8 kg (7.41 mol) of BCFL, 4.2 kg (1.15 mol) of polyorganosiloxane (in the formula (A), $R_1$ and $R_2$, each is hydrogen; $R_3$, $R_4$, $R_5$ and $R_6$, each is methyl group; $R_7$ is trimethylene group and X is a random copolymer of 34 unit of dimethylsiloxane and 4 unit of diphenylsiloxane (hereinafter "Si monomer") and 20 g of sodium dithionite were dissolved in 49 L of 8.8% (w/v) sodium hydroxide aqueous solution. 36 L of methylene chloride was added thereto and 2.02 kg of phosgene was injected over 30 minutes while maintaining to 15° C.

After the completion of injection, 77 g (0.51 mol) of p-tert-butyl phenol (hereinafter "PTBP") was added thereto and vigorously stirred for 10 minutes, and then 20 ml of triethylamine was added and stirred for about one hour to polymerize.

The polymer liquid was separated into an aqueous phase and an organic phase. The organic phase was neutralized with phosphoric acid. Water washing was repeated until electric conductivity of the washing liquid became 10 μs/cm or below, thus obtaining a purified resin liquid. The purified resin liquid thus obtained was slowly added in drop wise to hot water of 60° C. under vigorous stirring and the solvent was removed to solidify the polymer. The solid was filtered and dried, whereby a white powdery polymer was obtained.

The intrinsic viscosity [η] of the polymer was 0.25 dl/g. The polymer was analyzed by infrared absorption spectrum. Absorption due to carbonyl group near 1770 cm$^{-1}$ and absorption due to ether bond near 1240 cm$^{-1}$ were detected. Absorption due to hydroxyl group near 3650 to 3200 cm$^{-1}$ was little detected.

Monomers in the polycarbonate resin were determined by GPC analysis. The monomers were 20 ppm or below. From the above results, the proportion of BCFL to Si monomer in the polycarbonate resin was about the same as that in the charge.

300 ppm of monoglyceride stearate was added to the polycarbonats resin powder thus obtained and then the mixture was extruded with a 50 mm extruder with a vent, provided with a 50 μm polymer filter at 300° C. and melt pelletized. The pellets thus obtained were injection molded to a disc of outer diameter 120 mm and thickness 1.2 mm with a molder, SD-40α, manufactured by Sumitomo Jukikai Kogyo k.k., in Japan under the conditions of resin temperature 365° C., mold temperature 110° C., injection pressure 29.4 MPa and molding cycle of 14 second/piece and standing in a room for two days.

Birefringence by a light of 30 degree oblique incidence angle and transcription were measured for the disc thus obtained.

Further, a cast film of thickness 50 μm was prepared from the polycarbonate resin powder. Photoelastic sensitivity was measured for the cast film thus obtained.

EXAMPLE 5

The experiment was performed in the same manner as in Example 4 except that 2.8 kg (7.41 mol) of BCFL was changed to 3.50 kg (9.26 mol) of BCFL; 4.2 kg (1.15 mol) of Si monomer to 3.50 kg (0.96 mol) of Si monomer; 77 g (0.51 mol) of PTBP to 110 g (0.73 mol) of PTBP and 2.02 kg of phosgene to 2.41 kg of phosgene.

The intrinsic viscosity [η] of the polymer thus obtained was 0.26 dl/g. It was confirmed by infrared absorption analysis that the polymer had the same polycarbonate structure as in Example 4 except polymerization ratio.

EXAMPLE 6

The experiment was performed in the same manner as in Example 4 except that 2.8 kg (7.41 mol) of BCFL was changed to 4.90 kg (12.9 mol) of BCFL; 4.2 kg (1.15 mol) of Si monomer to 2.10 kg (0.58 mol) of Si monomer; 77 g (0.51 mol) of PTBP to 150 g (0.10 mol) of PTBP and 2.02 kg of phosgene to 3.18 kg of phosgene.

The intrinsic viscosity [η] of the polymer thus obtained was 0.28 dl/g. It was confirmed by infrared absorption analysis that the polymer had the same polycarbonate structure as in Example 4 except polymerization ratio.

COMPARATIVE EXAMPLE 5

The experiment was performed in the same manner as in Example 4 except that a commercial polycarbonate resin for optical recording medium (H-4000, manufactured by Mitsubishi Gas Chemical Co., Inc., in Japan, [η]=0.35 dl/g) derived from BPA was used instead of the polycarbonate resin in Example 4.

COMPARATIVE EXAMPLE 6

The experiment was performed in the same manner as in Example 4 except that 2.8 kg (7.41 mol) of BCFL was changed to 6.30 kg (16.7 mol) of BCFL; 4.2 kg (1.15 mol) of Si monomer to 0.70 kg (0.19 mol) of Si monomer; 77 g (0.51 mol) of PTBP to 190 g (1.27 mol) of PTBP and 2.02 kg of phosgene to 4.10 kg of phosgene.

The intrinsic viscosity [η] of the polymer thus obtained was 0.34 dl/g. It was confirmed by infrared absorption analysis that the polymer had the same polycarbonate structure as in Example 4 except polymerization ratio

COMPARATIVE EXAMPLE 7

The experiment was performed in the same manner as in Example 4 except that 2.8 kg (7.41 mol) of BCFL was changed to 1.40 kg (3.70 mol) of BCFL; 4.2 kg (1.15 mol) of Si monomer to 5.60 kg (1.53 mol) of Si monomer; 77 g (0.51 mol) of PTBP to 31 g (0.21 mol) of PTBP and 2.02 kg of phosgene to 1.23 kg of phosgene.

The intrinsic viscosity [η] of the polymer thus obtained was 0.32 dl/g. It was confirmed by infrared absorption analysis that the polymer had the same polycarbonate structure as in Example 4 except polymerization ratio.

COMPARATIVE EXAMPLE 8

The experiment was performed in the same manner as in Example 4 except that 4.2 kg (18.4 mol) of BPA was used instead of Si monomer and 77 g (0.51 mol) of PTBP was changed to 252 g (1.68 mol) of PTBP and 2.02 kg of phosgene to 3.32 kg (33.5 mol) of phosgene.

The intrinsic viscosity [η] of the polymer thus obtained was 0.34 dl/g. The proportion of BCFL to BPA in the polycarbonate resin was about the same as that in the charge.

The measurement results of birefringence, photoelastic sensitivity, intrinsic viscosity [η] transcription and appearance for the polycarbonate resin samples in Examples 4 to 6 and Comparative Examples 5 to 8 were shown in Table 3.

According to the present invention, a molding material for optical recording medium or a binder for photography with low birefringence, transcription and transparency also can be provided. Particularly, it is suitable to optical discs and optical magnetic discs capable of rewriting in which high density recording and reliability are required.

TABLE 1

| Example & Comp. Ex. | | Strength at yield (MPa) | Strength at break (MPa) | Elastic constant (GPa) | Elongation (%) | Tg (° C.) | 1 wt % reduced amount starting temperature (° C.) |
|---|---|---|---|---|---|---|---|
| Example | 1 | 20.4 | 30.0 | 5.3 | 142 | 160 | 441 |
|  | 2 | 25.7 | 22.5 | 6.9 | 83 | 163 | 402 |
|  | 3 | 31.6 | 28.3 | 7.8 | 120 | 157 | 394 |
| Comp.Ex. | 1 | — | 58.7 | 17.9 | 6 | 203 | 337 |
|  | 2 | 51.8 | 62.2 | 17.8 | 101 | 146 | 507 |

TABLE 2

| Example & Comp. Ex. | Appearance of wet molded film | Appearance of compression molded article |
|---|---|---|
| Example | | |
| 1 | good | good |
| 2 | good | good |
| 3 | good | good |
| Comp. Ex. | | |
| 1 | good | *2 |
| 2 | good | good |
| 3 | impossible *1 | impossible *1 |
| 4 | impossible *1 | *3 |

Note
*1: It was impossible to prepare a molded piece.
*2: The sample prior to molding had a little non-melted portion.
*3: The sample prior to molding had much non-melted portion.

TABLE 3

| Example & Comp. Ex. | Concentration of BCFL (wt %) | Birefringence by oblique incidence angle (nm) Distance from center | | | Photoelastic sensitivity (mm/kg) | Transcription (%) | Intrinsic viscosity (dl/g) | Appearance |
|---|---|---|---|---|---|---|---|---|
| | | R = 24 mm | R = 42 mm | R = 56 mm | | | | |
| Example 4 | 40 | 53 | 48 | 47 | 0.5 | 99 | 0.25 | ○*1 |
| 5 | 50 | 50 | 43 | 52 | 0.4 | 98 | 0.26 | ○*1 |
| 6 | 70 | 50 | 40 | 52 | 0.4 | 90 | 0.28 | ○*1 |
| Comp. Ex. 5 | — | 125 | 130 | 120 | 1.2 | 98 | 0.30 | ○*1 |
| 6 | 90 | — | — | — | 0.4 | 80 | 0.30 | ○*2 |
| 7 | 20 | — | — | — | 0.6 | 99 | 0.32 | ○*3 |
| 8 | 40 | 100 | 90 | 95 | 0.9 | 80 | 0.34 | ○*1 |

Note
*1: Transparent and good
*2: Transparent and crack
*3: Transparent and warp

What is claimed is:

1. A polycarbonate resin obtained by reaction of a carbonic acid ester-forming compound with bisphenols consisting of 9,9-bis(4-hydroxy-3-methylphenyl) fluorene and a bisphenol compound(s) having a structure represented by the following general formula (A), an intrinsic viscosity of said polycarbonate resin being 0.2 to 2.0 dl/g;

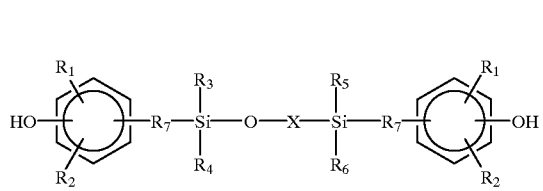

(A)

wherein $R_1$ and $R_2$ are, each independently, hydrogen, fluorine, chlorine, bromine, iodine, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl having 7 to 17 carbon atoms, an alkyl group having 1 to 5 carbon atoms with a substituent(s) of an alkyl group having 1 to 5 carbon atoms, an alkenyl group having 2 to 5 carbon atoms, an alkoxy group having 1 to 5 carbon atoms, fluorine, chlorine, bromine or iodine, an aryl group having 6 to 12 carbon atoms with said same substituent(s), an alkenyl group having 2 to 5 carbon atoms with said same substituent(s), an alkoxy group having 1 to 5 carbon atoms with said same substituent(s) or an aralkyl having 7 to 17 carbon atoms with said same substituent(s); $R_3$, $R_4$, $R_5$ and $R_6$ are, each independently, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl having 7 to 17 carbon atoms, an alkyl group having 1 to 5 carbon atoms with a substituent(s) of an alkyl group having 1 to 5 carbon atoms, an alkenyl group having 2 to 5 carbon atoms, an alkoxy group having 1 to 5 carbon atoms, fluorine, chlorine, bromine or iodine, an aryl group having 6 to 12 carbon atoms with said same substituent(s), an alkenyl group having 2 to 5 carbon atoms with said same substituent(s), an alkoxy group having 1 to 5 carbon atoms with said same substituent(s) or an aralkyl having 7 to 17 carbon atoms with said same substituent(s); $R_7$, is an alkylene group having 1 to 6 carbon atoms, an alkylidene group having 1 to 6 carbon atoms or absent; X is —Si($R_8$)($R_9$)O—, —Si($R_{10}$)($R_{11}$)O—, a homopolymer of —Si($R_8$)($R_9$)O— or —Si($R_{10}$)($R_{11}$)O—, having an average polymerization degree of more than 0 and 200 or below or a random copolymer of —Si($R_8$)($R_9$)O— and —Si($R_{10}$)($R_{11}$)O— having an average polymerization degree of more than 0 and 200 or below; $R_8$, $R_9$, $R_{10}$ and $R_{11}$ are, each independently, hydrogen, fluorine, chlorine, bromine, iodine, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl having 7 to 17 carbon atoms, an alkyl group having 1 to 5 carbon atoms with a substituent(s) of an alkyl group having 1 to 5 carbon atoms, an alkenyl group having 2 to 5 carbon atoms, an alkoxy group having 1 to 5 carbon atoms, fluorine, chlorine, bromine or iodine, an aryl group having 6 to 12 carbon atoms with said same substituent(s), an alkenyl group having 2 to 5 carbon atoms with said same substituent(s), an alkoxy group having 1 to 5 carbon atoms with said same substituent(s) or an aralkyl having 7 to 17 carbon atoms with said same substituent(s).

2. A polycarbonate resin according to claim 1, wherein said bisphenol compound(s) having a structure represented by the general formula (A) is(are) at least one compound selected from the group consisting of α, ω-bis[3-(o- hydroxyphenyl)propyl]polydimethylsiloxane, α, ω-bis[2-(p-hydroxyphenyl)ethyl]polydimethylsiloxane, a random copolymer of dimethylsiloxane and methylphenylsiloxane having 3-(o-hydroxyphenyl)propyl group at α,ω positions and methylphenylsiloxane and a random copolymer of dimethylsiloxane and diphenylsiloxane having 3-(o-hydroxyphenyl)propyl group at α,ω positions and diphenylsiloxane.

3. A polycarbonate resin according to claim 1, wherein said carbonic acid ester-forming compound is phosgene or diphenyl carbonate.

4. A polycarbonate resin according to claim 1, wherein the amount of said bisphenol compound(s) having a structure represented by the general formula (A) is 10 to 80% by weight of the total amount of 9,9-bis(4-hydroxy-3-methylphenyl) fluorene and said bisphenol compound(s) having a structure represented by the general formula (A).

5. A process for producing a polycarbonate resin described in claim 1, which comprises applying a solution polymerization process using phosgene as the carbonic acid ester-forming compound.

6. A process for producing a polycarbonate resin according to claim 5, which comprises reacting excess phosgene with 9,9-bis(4-hydroxy-3-methylphenyl) fluorene and then adding a bisphenol compound(s) having a structure represented by the general formula (A) to an emulsion obtained after the reaction and performing polymerization.

7. A process for producing a polycarbonate resin according to claim 5, which comprises reacting excess phosgene in the presence of a tetraammonium salt.

8. A molding material for optical recording media comprising a polycarbonate resin according to any one of claims 1 to 4.

9. A molding material for table ware and cooking ware comprising a polycarbonate resin according to any one of claims 1 to 4.

* * * * *